United States Patent
Wang et al.

(10) Patent No.: US 6,962,363 B2
(45) Date of Patent: Nov. 8, 2005

(54) MULTIPLE CHAMBER AIRBAGS AND METHODS

(75) Inventors: Yunzhang Wang, Duncan, SC (US); Ramesh Keshavaraj, Peachtree City, GA (US)

(73) Assignee: Milliken & Company, Spartenburg, SC (US)

( * ) Notice: Subject to any disclaimer, the term of this patent is extended or adjusted under 35 U.S.C. 154(b) by 25 days.

(21) Appl. No.: 09/900,838

(22) Filed: Jul. 6, 2001

(65) Prior Publication Data

US 2003/0034637 A1 Feb. 20, 2003

Related U.S. Application Data

(60) Provisional application No. 60/216,545, filed on Jul. 7, 2000.

(51) Int. Cl.[7] ............................................. B60R 21/24
(52) U.S. Cl. ................... 280/729; 280/743.2; 280/739
(58) Field of Search .................. 280/729, 743.2, 280/731, 739; B60R 21/24

(56) References Cited

U.S. PATENT DOCUMENTS

| | | | |
|---|---|---|---|
| 3,792,873 A | 2/1974 | Buchner et al. | 280/743.1 |
| 4,921,735 A | 5/1990 | Bloch | 428/349 |
| 4,944,529 A | 7/1990 | Backhaus | 280/743.1 |
| 5,087,071 A | 2/1992 | Wallner et al. | 280/743.1 |
| 5,090,729 A | 2/1992 | Watanabe | 280/743.1 |
| 5,093,163 A | 3/1992 | Krummheuer et al. | 428/351 |
| 5,110,666 A | 5/1992 | Menzel et al. | 428/196 |
| 5,236,775 A | 8/1993 | Swoboda et al. | 428/219 |
| 5,240,283 A * | 8/1993 | Kishi et al. | 280/729 |
| 5,253,892 A * | 10/1993 | Satoh | 280/731 |
| 5,277,230 A | 1/1994 | Sollars, Jr. | 139/389 |
| 5,310,216 A | 5/1994 | Wehner et al. | 280/743.1 |
| 5,316,337 A | 5/1994 | Yamaji et al. | 280/743.1 |
| 5,356,680 A | 10/1994 | Krummheuer et al. | 428/361 |
| 5,423,273 A | 6/1995 | Hawthorn et al. | 280/743 R |
| 5,454,594 A | 10/1995 | Krickl | 280/743.1 |
| 5,477,890 A | 12/1995 | Krummheuer et al. | 139/291 R |
| 5,501,488 A | 3/1996 | Saderholm et al. | 280/739 |
| 5,503,197 A | 4/1996 | Bower et al. | 139/435.1 |
| 5,508,073 A | 4/1996 | Krummheuer et al. | 428/351 |
| 5,520,416 A | 5/1996 | Singer, III et al. | 280/775 |
| 5,533,755 A | 7/1996 | Nelsen et al. | 280/743.1 |
| 5,560,649 A | 10/1996 | Saderholm et al. | 280/743.1 |
| 5,704,402 A | 1/1998 | Bowen et al. | 139/389 |

(Continued)

FOREIGN PATENT DOCUMENTS

| | | | |
|---|---|---|---|
| DE | 199 31 028 A1 * | 1/2000 | |
| EP | 0 775 614 A2 * | 5/1997 | |
| GB | 2 334 492 A * | 8/1999 | |
| JP | 404244453 A * | 9/1992 | |
| JP | 405246295 A * | 9/1993 | |
| JP | 409188216 A * | 7/1997 | |
| JP | 409188217 A * | 7/1997 | |
| JP | 9-188218 | 9/1997 | |
| WO | 00/03898 | 1/2000 | |
| WO | 00/12359 | 3/2000 | |
| WO | 00/15472 | 3/2000 | |
| WO | 00/15474 | 3/2000 | |
| WO | 01/08932 | 2/2001 | |

*Primary Examiner*—Ruth Ilan
(74) *Attorney, Agent, or Firm*—Terry T. Moyer

(57) ABSTRACT

A two or more chambered airbag provides much improved safety and/or performance. A modified single chamber airbag can be used as the primary chamber of the two-chamber airbag. A piece of fabric of appropriate size is sewn to the inside or outside surface of the front panel of the primary chamber to create the secondary chamber. One or more apertures are opened between the primary and secondary chambers. In order for the secondary chamber to inflate properly, the tethers of the primary chamber are shortened to 50% to 80% of their original length. The size or location of the tether sewing to the inner surface of the front panel of the primary chamber is also adjusted to create a desired shape of the secondary chamber when deployed.

13 Claims, 13 Drawing Sheets

U.S. PATENT DOCUMENTS

| | | |
|---|---|---|
| 5,802,479 A | 9/1998 | Kithil et al. .................. 701/45 |
| 5,884,939 A | 3/1999 | Yamaji et al. ........... 280/743.1 |
| 5,899,490 A | 5/1999 | Wipawuramonton et al. ....................... 280/730.2 |
| 5,901,979 A | 5/1999 | Schneider et al. .......... 280/738 |
| 5,906,391 A | 5/1999 | Weir et al. .................. 280/729 |
| 5,927,748 A | 7/1999 | O'Driscoll .................. 280/729 |
| 5,934,701 A | 8/1999 | Furukawa ................ 280/730.1 |
| 5,941,559 A * | 8/1999 | Rudolf et al. ................ 280/729 |
| 5,945,184 A | 8/1999 | Nagata et al. ............. 428/35.2 |
| 6,014,602 A | 1/2000 | Kithil et al. .................. 701/45 |
| 6,029,997 A | 2/2000 | Kwon ..................... 280/743.1 |
| 6,059,312 A | 5/2000 | Staub et al. ................. 280/729 |
| 6,086,095 A | 7/2000 | Keshavaraj .............. 280/743.1 |
| 6,186,544 B1 | 2/2001 | Igawa ..................... 280/743.1 |
| 6,209,911 B1 | 4/2001 | Igawa et al. ................. 280/740 |
| 6,213,496 B1 | 4/2001 | Minami et al. ............. 280/729 |
| 6,224,101 B1 | 5/2001 | Nishijima et al. ........ 280/743.2 |
| 6,254,121 B1 * | 7/2001 | Fowler et al. ............... 280/729 |
| 6,419,267 B1 * | 7/2002 | Hashimoto et al. ...... 280/743.1 |
| 6,494,484 B2 * | 12/2002 | Bosgieter et al. ......... 280/743.1 |
| 2001/0030418 A1 | 10/2001 | Keshavaraj .............. 280/743.2 |
| 2002/0008374 A1 | 1/2002 | Keshavaraj .............. 280/743.1 |
| 2002/0027353 A1 | 3/2002 | Keshavaraj .............. 280/743.2 |

* cited by examiner

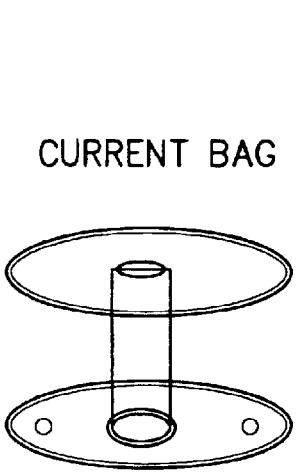
FIG.-1-
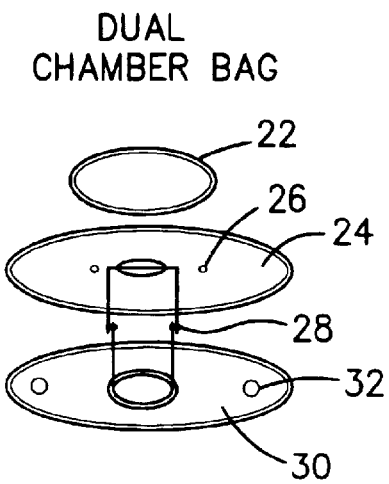
FIG.-2-
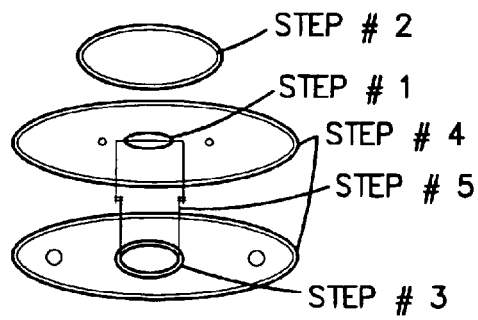
FIG.-3-
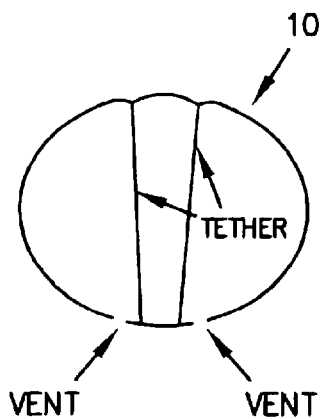
FIG.-4-
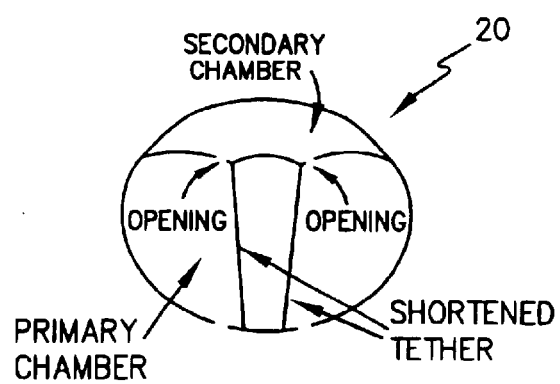
FIG.-5-

PRODUCTION FORD TAURUS
DRIVER AIRBAG
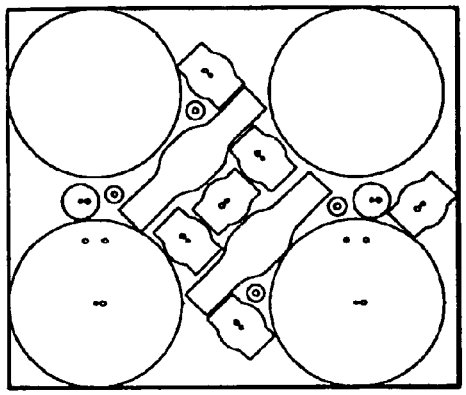
USES 1.005 LINEAR YARD/BAG
*FIG. —6—*
NEW TWO-CHAMBER
DRIVER AIRBAG
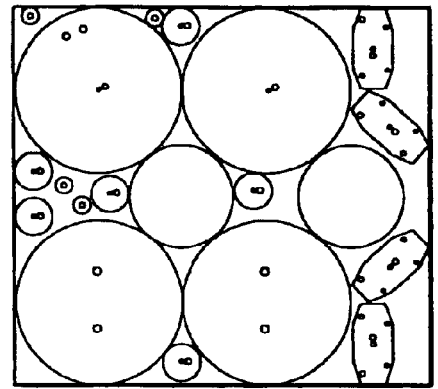
USES 0.94 LINEAR YARD/BAG
*FIG. —7—*
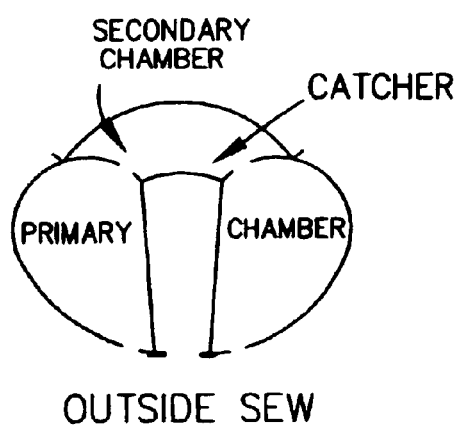
OUTSIDE SEW
*FIG. —8—*
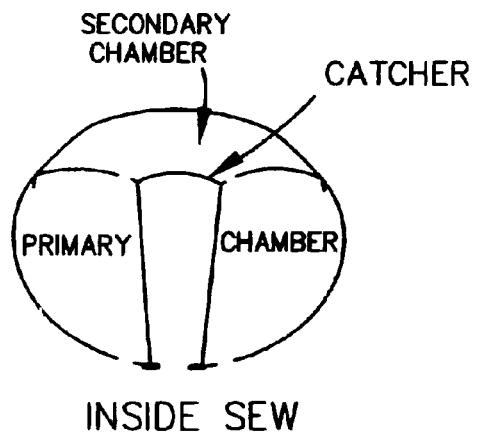
INSIDE SEW
*FIG. —9—*

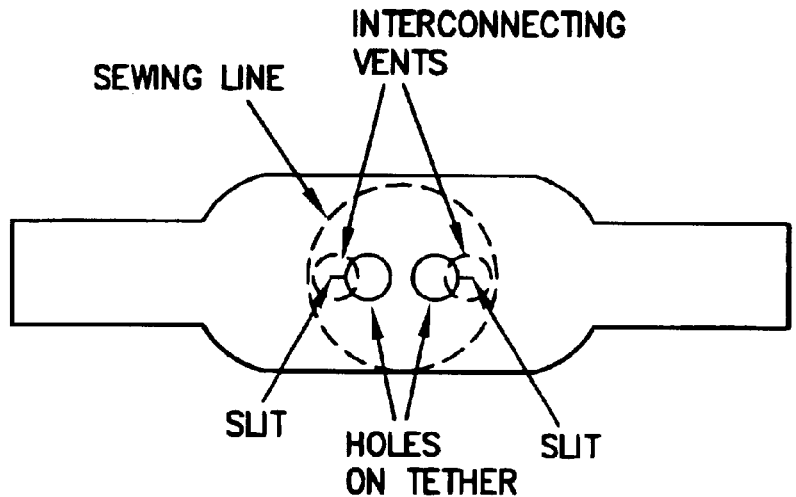
FIG. -10-
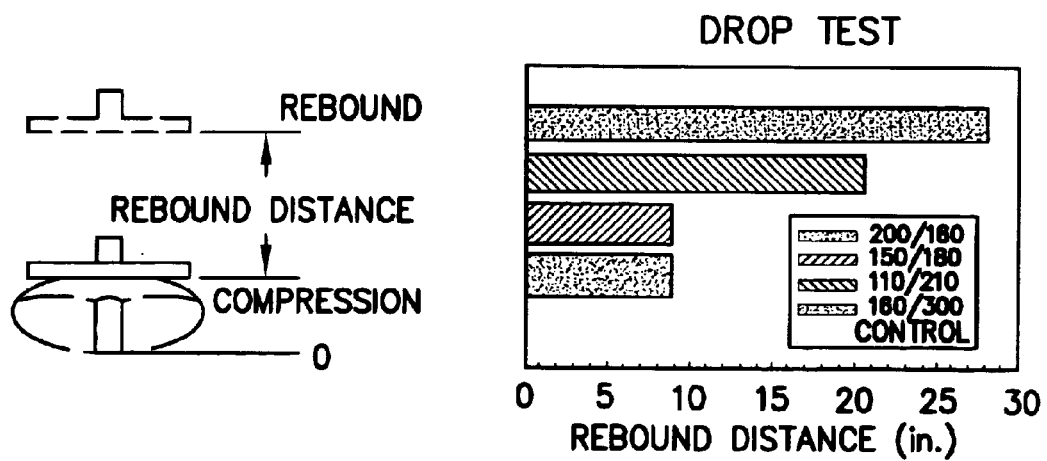
FIG. -11A-
FIG. -11B-

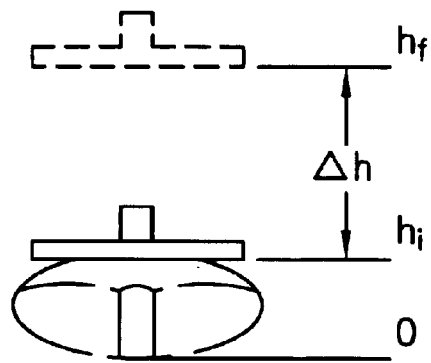
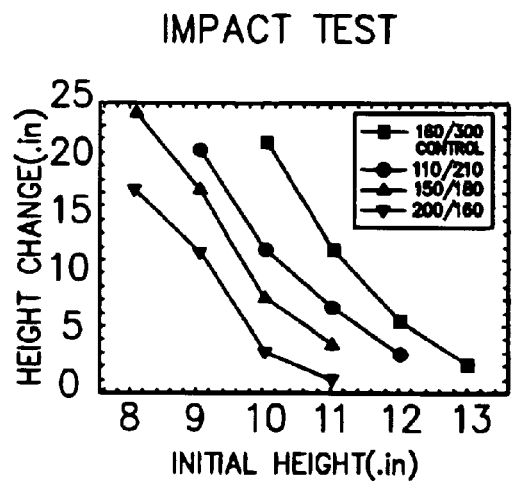
*FIG. -12A-*  *FIG. -12B-*
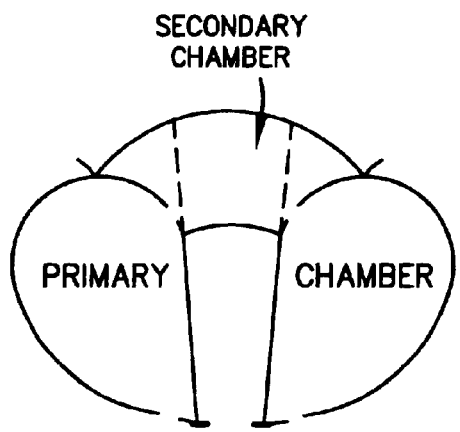
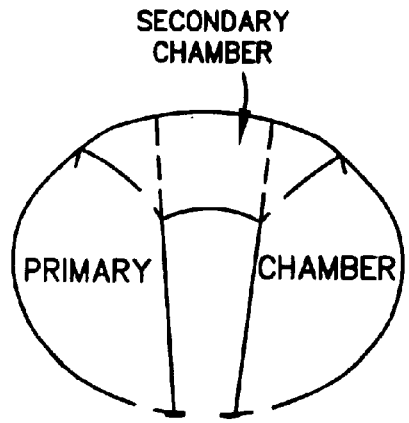
*FIG. -13-*  *FIG. -14-*

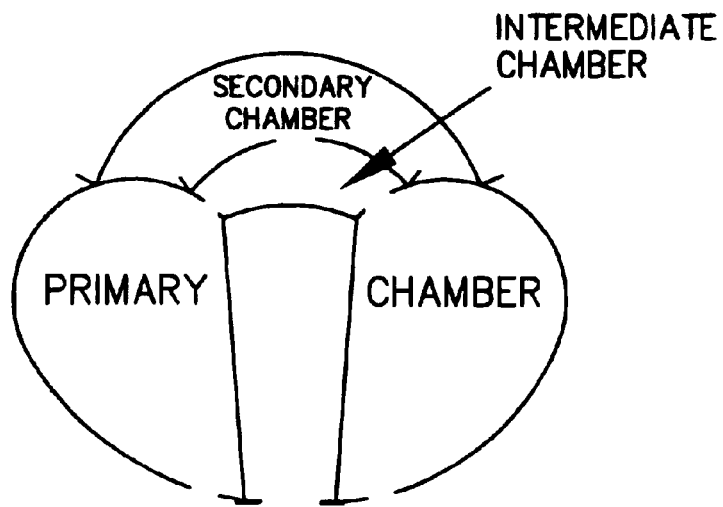
FIG. -15-
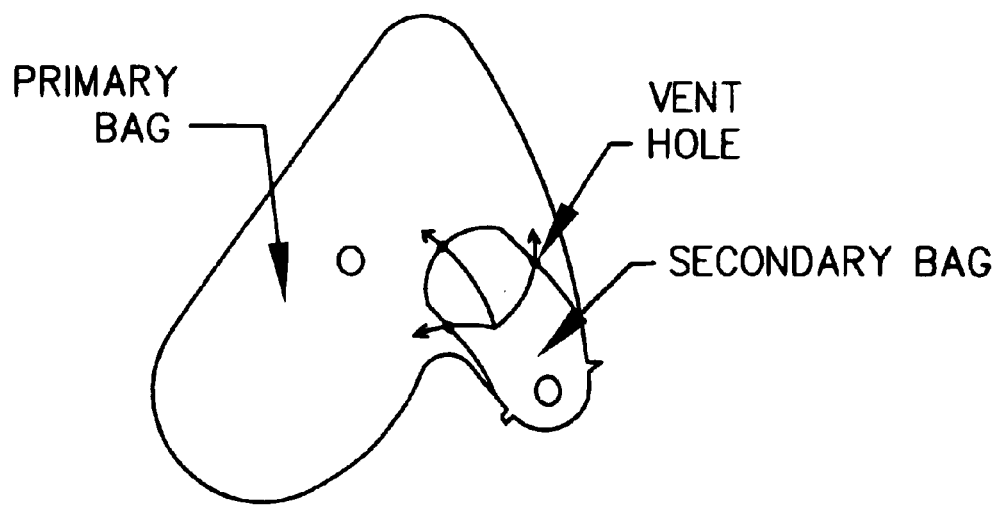
FIG. -16-

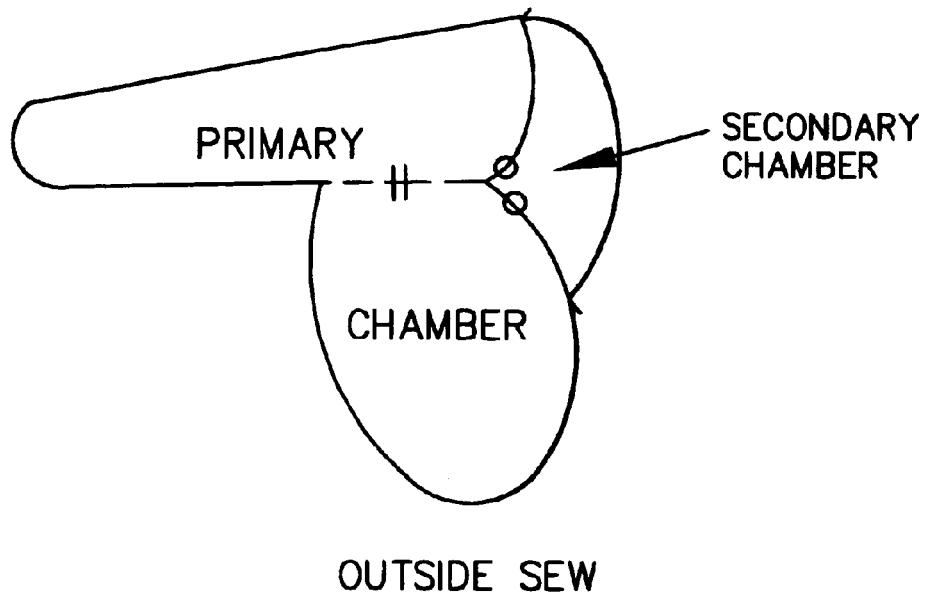
OUTSIDE SEW
FIG. -17-
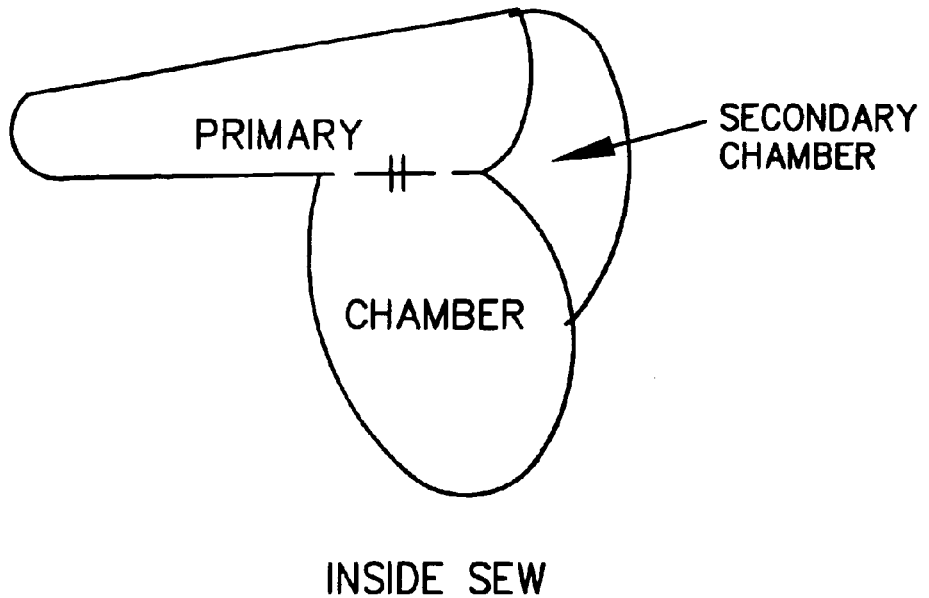
INSIDE SEW
FIG. -18-

SEAM CONNECTING HALF OF TETHER TO FRONT PANEL
(NOTE: THE SMALL SQUARE PIECE IS INDEPENDANT OF THIS SEW).

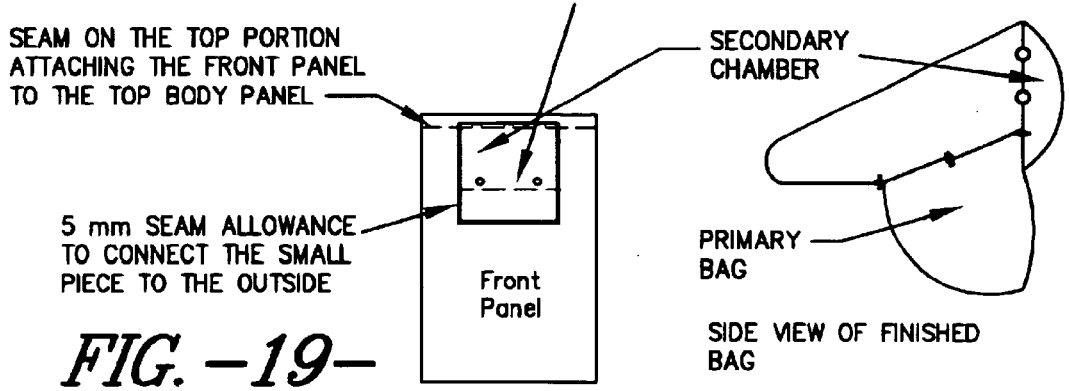

*FIG. -19-*

SIDE VIEW OF FINISHED BAG

*FIG. -20-*

SHOWN WITH SMALL SECONDARY CHAMBER AT THE HEAD CONTACT PORTION

STAGES OF DEPLOYMENT

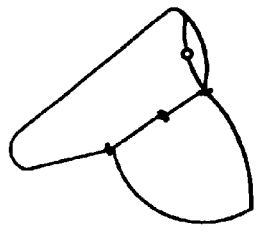

*FIG. -21A-*

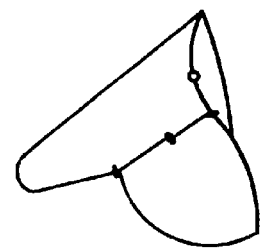

*FIG. -22A-*

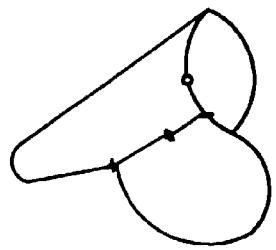

*FIG. -23A-*

SHOWN WITH A LARGER SECONDARY CHAMBER ACROSS THE ENTIRE HEAD AND THRORAX AREA

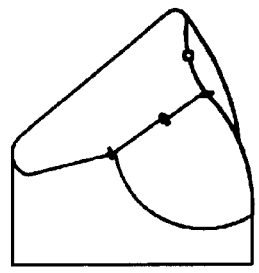

EXCURSION FOR 5 YR OLD CHILD

*FIG. -21B-*

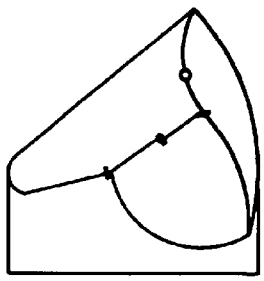

EXCURSION FOR 50 % OR SMALL FEMALE

*FIG. -22B-*

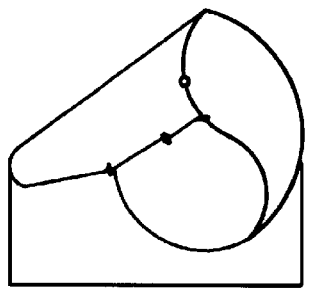

EXCURSION FOR 95 % OR LARGE MALE

*FIG. -23B-*

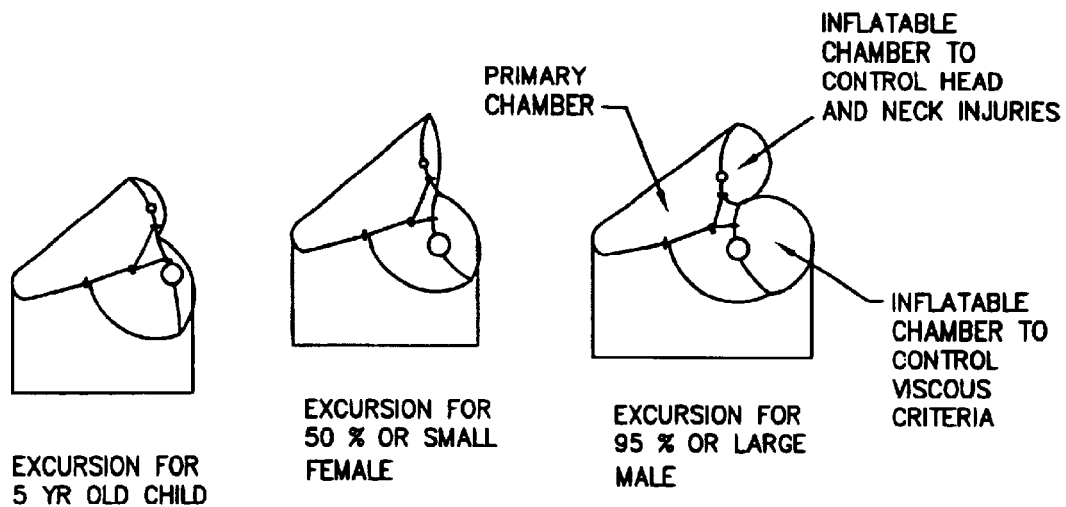
EXCURSION FOR 5 YR OLD CHILD
FIG. -24-
EXCURSION FOR 50 % OR SMALL FEMALE
FIG. -25-
EXCURSION FOR 95 % OR LARGE MALE
FIG. -26-
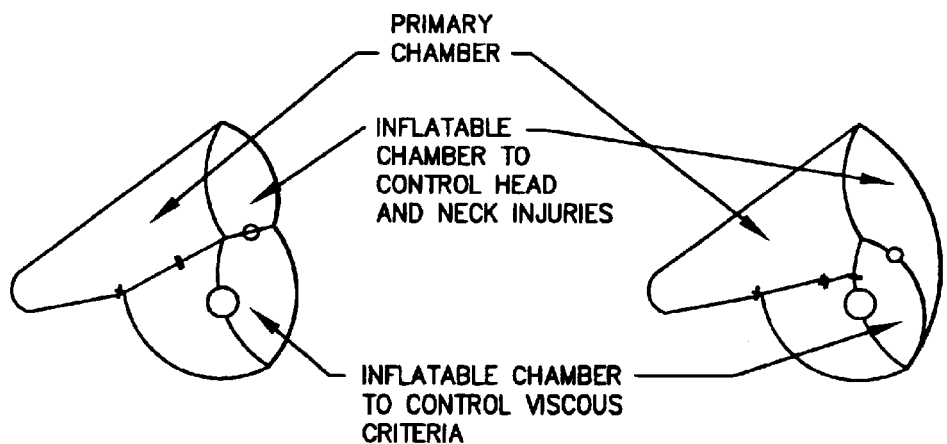
FIG. -27-
FIG. -28-

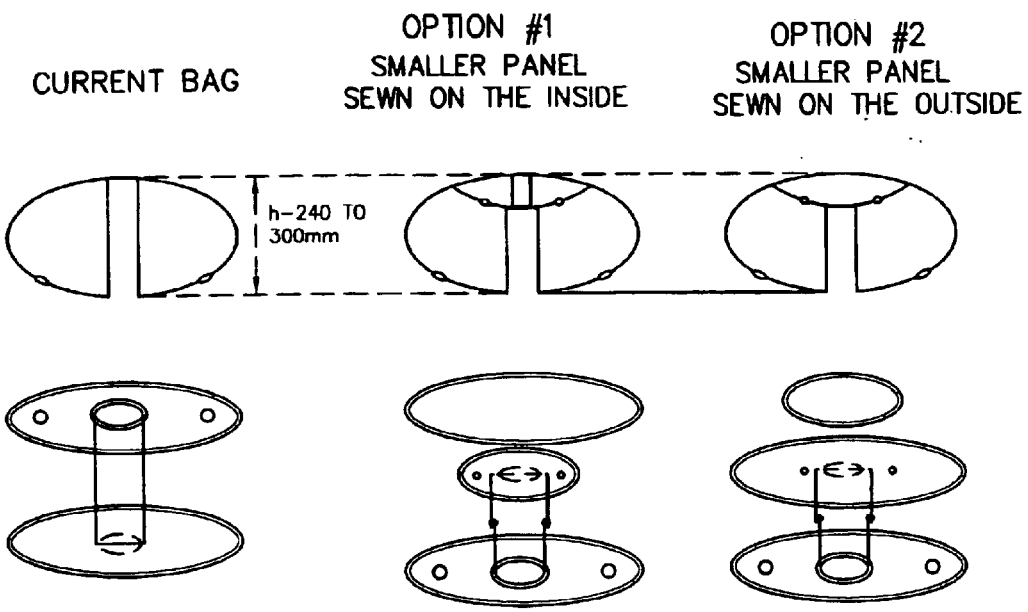
FIG.-29- FIG.-30- FIG.-31-
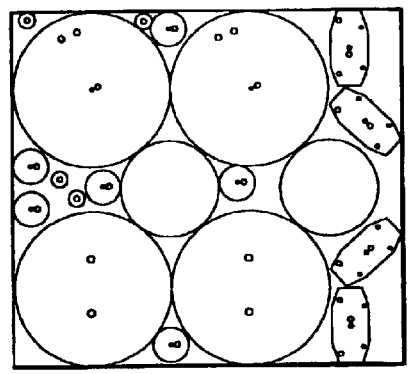
NEW AND IMPROVED BAG
USES 0.94 LN.YDS PER BAG
FIG.-32-
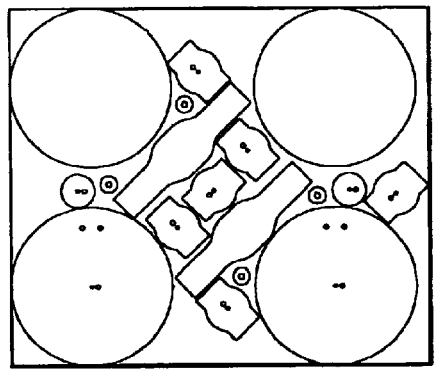
PRODUCTION BAG USES
1.005 Ln.Yds. PER BAG
FIG.-33-

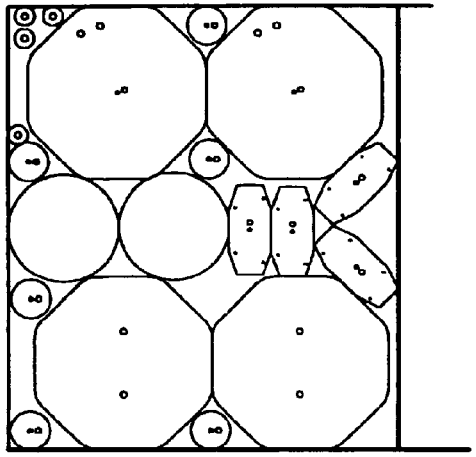
NEW AND IMPROVED BAG WITH OCTAGON SHAPED PANELS USES 0.805 Ln.Yds. PER BAG
*FIG. −34−*
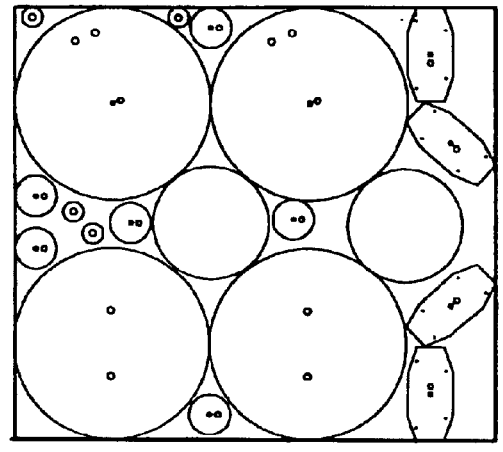
NEW AND IMPROVED BAG USES 0.94 Ln.Yds. PER BAG
*FIG. −35−*
OCTAGON SHAPED OUTER PANEL
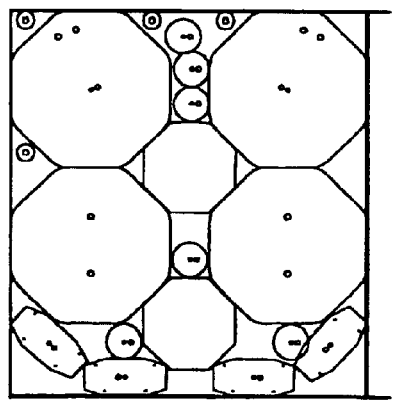
*FIG. −36−*

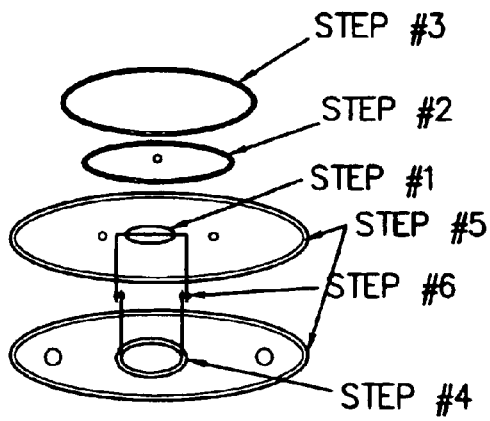
FIG. -37-
THREE CHAMBER AIRBAG
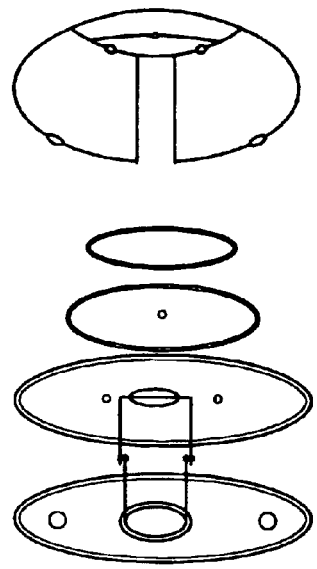
FIG. -38-
PRODUCTION FORD TAURUS DRIVER BAG
THREE CHAMBER AIRBAG
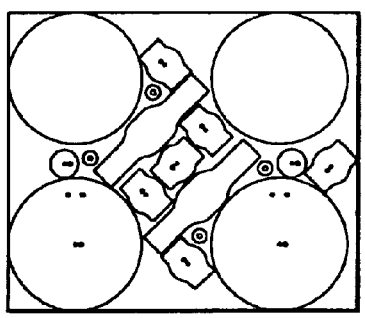
PRODUCTION BAG USES 1.005 Ln.Yds. PER BAG
FIG. -39-
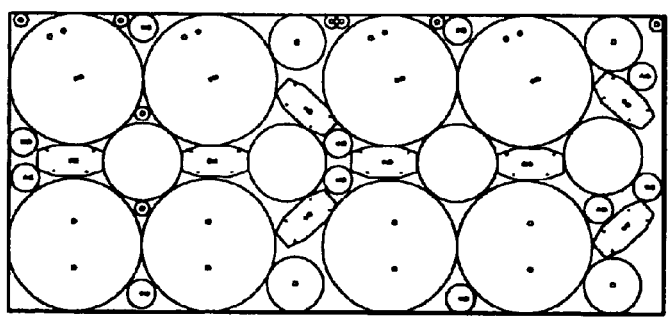
NEW AND IMPROVED BAG USES 0.94 Ln.Yds. PER BAG
FIG. -40-

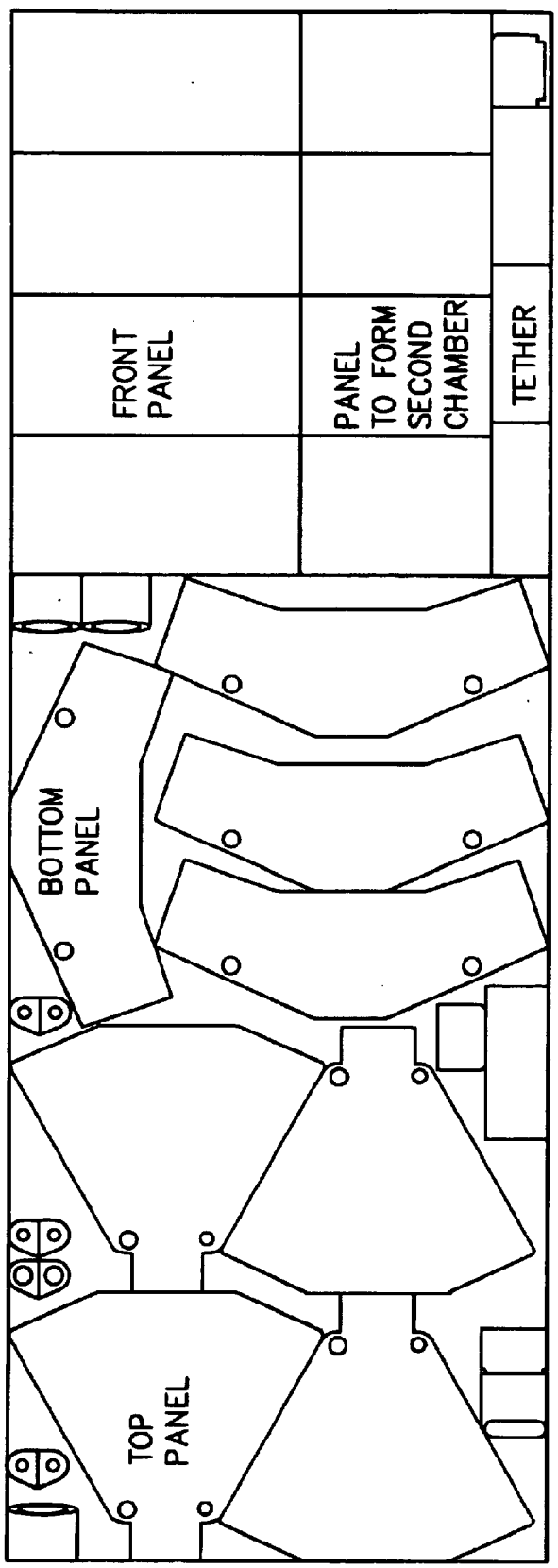
FIG. -41-
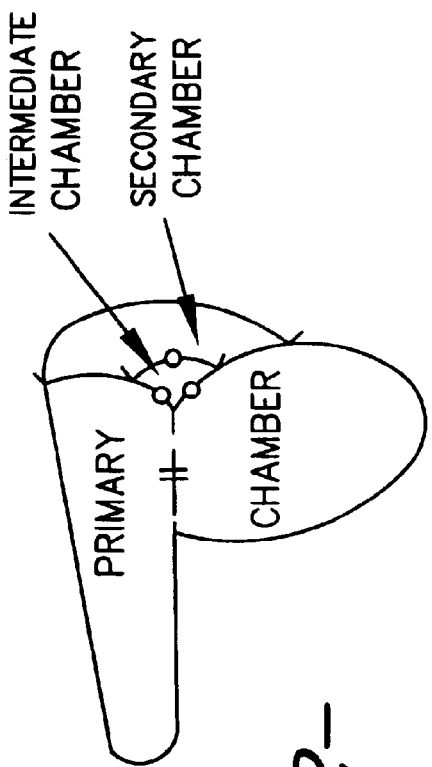
FIG. -42-

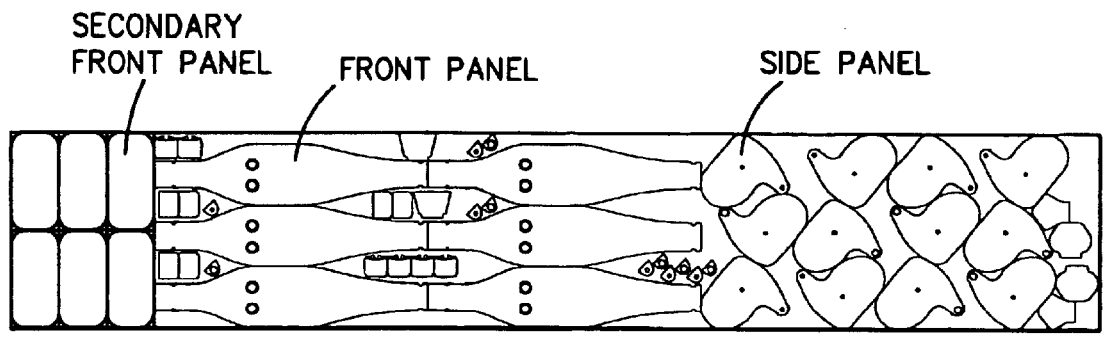
FIG. -43-
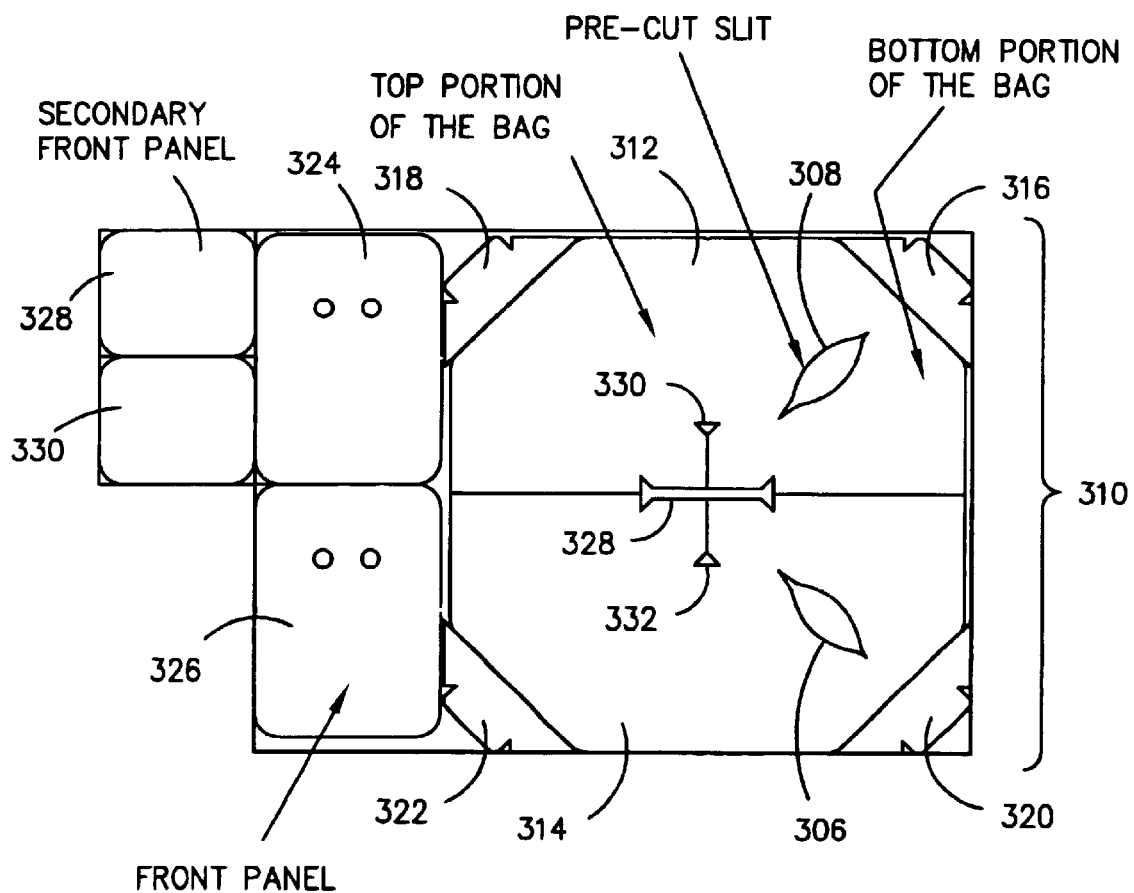
FIG. -44-

MULTIPLE CHAMBER AIRBAGS AND METHODS

This application claims priority to and benefit of U.S. Provisional Patent Application Ser. No. 60/216,545, filed Jul. 7, 2000, and hereby incorporated by reference.

FIELD OF THE INVENTION

The present invention relates to a multi-chamber airbag or airbag cushion and method. Such a cushion may simultaneously exhibit a very low amount of fabric utilized to produce the target airbag cushion in correlation to an overall high amount of available inflation airspace within the cushion itself. These two correlative elements are combined in what is defined as an effective fabric usage index (being the quotient of the amount of fabric utilized in the construction of the airbag cushion and the available inflation airspace volume). A cushion exhibiting low seam usage factor, low total fabric weight, low fabric usage factor and/or comprising two or more chambers is provided as well as an overall vehicle restraint system including the inventive airbag cushion.

BACKGROUND OF INVENTION

All U.S. patents cited herein are hereby filly incorporated by reference.

Inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filing the cushion to a deployed state which can absorb the impact of the forward movement of a body and dissipate its energy by means of rapid venting of the gas. The entire sequence of events occurs within about 100 milliseconds. In the undeployed state, the cushion is stored in or near the steering column, the dashboard, in a door, or in the back of a front seat placing the cushion in close proximity to the person or object it is to protect.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., issued Jul. 9, 1996, the teachings of which are incorporated herein by reference.

Inflatable cushions for use in the protection of passengers against frontal or side impacts must generally have a more complex configuration since the position of a vehicle passenger may not be well defined and greater distance may exist between the passenger and the surface of the vehicle against which that passenger might be thrown in the event of a collision. Prior cushions for use in such environments are disclosed in U.S. Pat. No. 5,520,416 to Bishop, issued May 28, 1996; U.S. Pat. No. 5,454,594 to Krickl issued Oct. 3, 1995; U.S. Pat. No. 5,423,273 to Hawthorn et al. issued Jun. 13, 1995; U.S. Pat. No. 5,316,337 to Yamaji et al. issued May 31, 1994; U.S. Pat. No. 5,310,216 to Wehner et al. issued May 10, 1994; U.S. Pat. No. 5,090,729 to Watanabe issued Feb. 25, 1992; U.S. Pat. No. 5,087,071 to Wallner et al. issued Feb. 11, 1992; U.S. Pat. No. 4,944,529 to Backhaus issued Jul. 31, 1990; and U.S. Pat. No. 3,792,873 to Buchner et al. issued Feb. 19, 1974, all of which are incorporated herein by reference.

The majority of commercially used restraint cushions are formed of woven fabric materials utilizing multifilament synthetic yarns of materials such as polyester, nylon 6 or nylon 6,6 polymers. Representative fabrics for such use are disclosed in U.S. Pat. No. 4,921,735 to Bloch issued May 1, 1990; U.S. Pat. No. 5,093,163 to Krummheuer et al. issued Mar. 3, 1992; U.S. Pat. No. 5,110,666 to Menzel et al. issued May 5, 1992; U.S. Pat. No. 5,236,775 to Swoboda et al. Aug. 17, 1993; U.S. Pat. No. 5,277,230 to Sollars, Jr. issued Jan. 11, 1994; U.S. Pat. No. 5,356,680 to Krummheuer et al. Oct. 18, 1994; U.S. Pat. No. 5,477,890 to Krummheuer et al. issued Dec. 26, 1995; U.S. Pat. No. 5,508,073 to Krummheuer et al., issued Apr. 16, 1996; U.S. Pat. No. 5,503,197 to Bower et al. issued Apr. 2, 1996 and U.S. Pat. No. 5,704,402 to Bowen et al. issued Jan. 6, 1998, all of which are incorporated herein by reference.

As will be appreciated, the permeability of the cushion structure is an important factor in determining the rate of inflation and subsequent rapid deflation following the impact event. In order to control the overall permeability of the cushion, it may be desirable to use differing materials in different regions of the cushion. Thus, the use of several fabric panels in construction of the cushion may prove to be a useful design feature. The use of multiple fabric panels in the cushion structure also permits the development of relatively complex three-dimensional geometries which may be of benefit in the formation of cushions for passenger side applications wherein a full-bodied cushion is desired. While the use of multiple fabric panels provides several advantages in terms of permeability manipulation and geometric design, the use of multiple fabric panels for use in passenger side restraint cushions has historically required the assembly of panels having different geometries involving multiple curved seams.

As will be appreciated, an important consideration in cutting panel structures from a base material is the ability to maximize the number of panels which can be cut from a fixed area through close-packed nesting of the panels. The term "seam" denotes any manner or method of connecting separate fabric panels or separate portions of a single fabric panel. Thus, sewing (with thread, for example), welding (with ultrasonic stitching, for example), or weaving panels or portions together (with a jacquard or dobby loom, for example), and the like, may be employed for this purpose.

However, a problem still resides in the need for labor-intensive cutting and sewing operations for large-scale manufacture. Furthermore, since the costs of producing airbag fabrics are relatively high and there is a general need to reduce such costs, there is a consequent need to more efficiently make use of the fabric by lowering the amount which needs to be cut (cutting operations also translate into higher labor costs), reducing the amount of fabric used in order to provide substantially lower packing volumes (in order to reduce the size of the airbag modules in cars since available space on dashboards, doors, and the like, are at a premium within automobiles), and reducing the shipping weight of such products (which translates into lower shipping costs), as well as other highly desired reasons. However, it has been problematic to reduce such utilized fabric amounts in the past without consequently also reducing the available inflation airspace volume within the cushion product. There is a need then to reduce the amount of time to produce airbag cushions while simultaneously providing the lowest amount of fabric and simultaneously allow for a sufficient volume of air (gas) to inflate the target airbag cushion during an inflation event (herein described as "available inflation airspace""). Such a desired method and product has not been available, particularly for passenger-side airbags which, as noted previously require greater amount of fabric for larger volumes of air (gas) to provide the greatest amount of protection area to a passenger. With greater amounts of fabric needed, generally this has translated into the need for longer seams to connect and attach fabric panels, which in turn translates into greater amounts of time needed for sewing, and the like, operations. Furthermore, there is a need for simultaneously reducing the required amount of utilized fabric while providing sufficient volumes of available inflation airspace within the target airbag cushion. Thus, a need exists to produce an improved multi-chamber airbag cushion, and such a cushion having high available inflation airspace volume with a minimal requirement in fabric utilization to manufacture the overall cushion product.

U.S. Pat. No. 5,927,748 entitled Multi-Stage Inflatable Bag for Vehicular Safety Systems describes a multi-stage airbag with an inner smaller bag and an outer larger bag construction. The inner bag is inflated using the full force of the inflator for the initial expansion. The outer bag is inflated through the inner bag, thus more slowly. However, the airbag described here is basically a bag-in-a-bag construction. It is more difficult to construct hence higher cost. Also it is difficult to put tethers in such bags to control the final shape of the deployed bag. The vent is from the outer bag, thus the outer bag may be too weak to protect a larger and heavier occupant.

U.S. Pat. No. 5,934,701 entitled Automobile Airbag describes an airbag that can provide protection against leftward and rightward as well as frontal impacts. In one embodiment, an auxiliary chamber was used. This auxiliary chamber was independently constructed with its own filling port.

U.S. Pat. No. 5,501,488 entitled Airbags with Alternate Deployment discloses a means to fabricate an airbag that, in addition to its normal reach, can deploy to a shorter reach when a driver is too close to the airbag at the moment of collision. In the normal mode of deployment normal vents are covered by released flaps, causing the airbag to exert a large rebound force on the driver following the deployment. In the case where the driver is sitting just farther than the flap release position, the effect may be fatal.

WO Publication Number 003898A1 entitled An Airbag describes an airbag with multiple compartments connected by vents, which can be inflated sequentially. However, due to the complicated design, the fabrication cost will be high. Also, in order for the third chamber to inflate adequately, the pressure in the first chamber needs to be very high. This could be very dangerous to a short occupant sitting close to the airbag considering the fact that the excursion of the primary chamber is rather high, especially when the occupant is tilted sideways at the instant of collision.

SUMMARY OF THE INVENTION

In view of the foregoing, it is a general object of the present invention to provide a cost-effective, easy to manufacture airbag cushion for utilization within a vehicle restraint system. The term "vehicle restraint system" is intended to mean both inflatable occupant restraining cushion and the mechanical and chemical components (such as the inflation means, ignition means, propellant, and the like). It is a more particular object of the present invention to provide a vehicle restraint system wherein the target airbag cushion has multiple chambers and preferably comprises very low amounts or weight of fabric. A further object of this invention is to provide an easy-to-assemble airbag cushion which is minimally labor-intensive to manufacture, requires much lower fabric costs due to a substantial reduction in the overall requirement of utilized fabric amounts, and which also comprises an integrated looped pocket for the disposition of an inflator can within the airbag cushion. It is still a further object of this invention to provide a vehicle restraint system comprising an airbag cushion which provides a multiple chamber airbag with a large amount of available inflation airspace volume simultaneously with a low length of seam (or seams) and low amount of utilized fabric necessary to manufacture the cushion. Another object of the invention is to provide a method of making a low cost airbag cushion (due to low levels of labor required to sew the component parts together and reduced amount of fabric to manufacture and cut) of simple and structurally efficient design.

To achieve these and other objects and in accordance with the purpose of the invention, as embodied and broadly described herein, the present invention provides an airbag cushion having at least one fabric component, and wherein said airbag cushion possesses an effective fabric usage factor of less than about 0.095. The effective fabric usage factor is derived from an effective fabric usage index which concerns (and is defined as) the quotient of the total amount of fabric utilized to manufacture the airbag cushion (measured in square meters) over the total volume of available inflation airspace within the airbag cushion (measured in liters). In order to exhibit a sufficiently low effective fabric usage factor, the amount of fabric must be very low with a correspondingly high available inflation airspace volume. Of course, this airspace volume will be the same for each factor since the measurements of both factors (seam usage and fabric usage) are made for the same bag. Such an airbag cushion may comprise at least two separate fabric panels or a single panel with portions which require connection. The inventive bag is able to provide high available inflation airspace volumes due to the particular configurations of the used fabric panels or portions. The preferred configurations permit more efficient utilization of fabric webs by cutting panels from the webs and producing less waste of unused fabric. The preferred embodiment is discussed in greater detail below.

Although it is preferred that the airbag cushion be constructed of a fabric (hence the term fabric usage factor), it is to be understood that the airbag cushion may be formed of one or more fabrics or other materials such as films, laminates, etc. Consequently, the present invention encompasses the use of other airbag materials and can be defined by an effective airbag material usage factor as well as an effective fabric usage factor. The effective material usage factor is derived from an effective material usage index defined as the quotient of total amount of material utilized to manufacture the airbag cushion (measured in square meters) over the total volume of available inflation airspace within the airbag cushion (measured in liters).

The effective fabric usage factor (as defined within the correlating seam usage index formula, above) for the inventive airbag cushion is preferably less than about 0.095, more preferably less than 0.09, still more preferably less than 0.085, even more preferably less than 0.08, and most preferably lower than 0.075. Thus, the volume of available inflation airspace within the airbag cushion should be as great as possible with the amount of fabric utilized reduced to its absolute minimum while still providing sufficient protection to a passenger in an automobile during a collision event.

A driver-side airbag will generally comprise a low amount of utilized fabric but also does not provide a correlative high volume of available airspace; and the prior art passenger-side airbags require large amount of fabric. Although the available inflation airspace volume in such conventional passenger-side airbags is rather large, the total amount of utilized fabric is too large to meet the aforementioned preferred effective fabric usage factor within that index. The inventive cushion therefore is relatively easy to manufacture, requires very low sewing, or similar type attachment operations of its fabric panel components, requires very low amounts of fabric, but is also configured to provide an optimum large amount of available inflation airspace for maximum protection to a passenger during a collision event.

In at least one embodiment, the present invention also provides an airbag cushion possessing the required effective fabric usage factor which also comprises a looped pocket for introduction of the inflator can of an inflator assembly. The multi-chamber airbag need not be created from mirror-image body panel sections as any configuration of fabric panels will function properly in this invention as long as a three-dimensional inflatable cushion is formed during an inflation event and a looped pocket is created in the airbag in which at least the inflator can of an inflator assembly is disposed.

Additional objects and advantages of the invention will be set forth in part in the description which follows, and in part will be obvious from the description, or may be learned by practice for the invention. It is to be understood that both the foregoing general description and the following detailed description of preferred embodiments are exemplary and explanatory only, and are not to be viewed as in any way restricting the scope of the invention as set forth in the claims.

Current single-chamber airbags have two significant drawbacks: First, they may exert a large rebound force on the occupant after deployment, putting the occupant at risk of possible neck injury. Second, they may hurt rather than protect an occupant if the occupant is sitting very close to the airbag (as shorter and/or older drivers often do) when a collision occurs. At least selected embodiments of the multiple-chamber or two-chamber airbag of the present invention described herein will reduce rebound dramatically and provide protection for an out of position occupant sitting close to the airbag.

At least one embodiment of the two-chamber airbag disclosed herein is based on the current single-chamber airbag design but with several novel modifications to provide much improved safety and/or performance. The current single chamber airbag can be modified and used as the primary chamber of the two-chamber airbag. In one embodiment, a piece of fabric of appropriate size is sewn to the outside surface of the front panel of the primary chamber to create the secondary chamber. One or more apertures are opened between the primary and secondary chambers. In order for the secondary chamber to inflate properly, the tethers of the primary chamber are preferably shortened to 50% to 80% of their original length. The size of the tether sewing to the inner surface of the front panel of the primary chamber is also adjusted to create a desired concave shape of the secondary chamber when deployed.

FIGS. 1 and 2 schematically compare the typical components used in the manufacturing of a single chamber airbag (FIG. 1) and the new dual or multiple chamber airbag (FIG. 2). In FIG. 3, the step-wise sewing approach for this new dual chamber airbag is illustrated. From FIG. 3, it is obvious that the manufacturing steps involved in the multi-chamber bag are similar to the current approach except for added steps for attaching the tether portions, attaching the smaller panel, adding venting between the chambers, etc.

FIGS. 4 and 5 compare schematically the design and the shapes of the single chamber airbag 10 and the two-chamber airbag 20 when deployed.

The two-chamber airbag 20 shows significantly improved safety performance as compared to the single-chamber airbag 10 in terms of reducing rebound and providing protection for an out of position occupant sitting very close to the airbag. Drop tests (where an 83-lb. weight was dropped on the inflated bags) showed that the rebound distance of the weight from the two-chamber airbag was reduced as much as 70% from that of the single chamber airbag. Impact tests (where the movement distance was measured from the weight initially resting in a fixed position after it was impacted by the deploying airbag) showed that the energy dissipated on the weight by the two-chamber airbag was much less than that from the single-chamber airbag when the weight was at the same initial rest position. In other words, the two-chamber airbag of the present invention dissipates the same amount of energy to the occupant sitting much closer to the steering wheel, thus providing protection for an out of position occupant sitting closer to the airbag. Inflation tests showed that due to the shortened tether, the primary chamber of the two-chamber airbag inflated much faster with a much shorter maximum excursion length than the single chamber airbag, again providing protection for an out of position occupant sitting close to the airbag.

BRIEF DESCRIPTION OF DRAWINGS

The accompanying drawings, which are incorporated in and constitute a part of this specification, illustrate several potentially preferred embodiments of the invention and together with the description serve to explain the principles of the invention wherein:

FIG. 1 is a schematic perspective view of the components of a single chamber tethered airbag.

FIG. 2 is a schematic perspective view of the components of one embodiment of the multiple chamber airbag of the present invention.

FIG. 3 is a schematic perspective view of the assembly steps of the airbag of FIG. 2.

FIG. 4 is a schematic cross-section representation of an inflated tethered single chamber airbag.

FIG. 5 is a schematic cross-section illustration of an inflated dual chamber airbag of the present invention such as that of FIG. 2.

FIGS. 6 and 7 are exemplary fabric layout diagrams.

FIGS. 8 and 9 are exemplary cross section illustrations of respective inflated two-chamber airbag embodiments of the present invention.

FIG. 10 is a part diagram of a tether of the present invention with vent openings.

FIG. 11A is a schematic side view diagram of a rebound test.

FIG. 11B is a graphical representation of rebound distance data.

FIG. 12A is a schematic side view representation of an impact test.

FIG. 12B is a graphical representation of impact test data.

FIGS. 13 and 14 are respective cross section illustrations of inflated two-chamber airbag embodiments of the present invention having tethered secondary chambers.

FIG. 15 is a cross section representation of an inflated three-chamber airbag in accordance with another embodiment of the present invention.

FIG. 16 is a schematic representation of an inflated conventional bag-in-bag passenger airbag.

FIGS. 17 and 18 are schematic respective cross section views of inflated two-chamber passenger airbag embodiments in accordance with the present invention.

FIG. 19 is a front view illustration of a two-chamber passenger airbag of the present invention.

FIG. 20 is a cross section representation of the airbag of FIG. 19.

FIGS. 21 through 23 are respective side view illustrations of stages of deployment of two-chamber passenger airbag embodiments of the invention. FIGS. 21A–23A are directed to an embodiment with a small secondary chamber. FIGS. 21B–23B are directed to an embodiment with a larger secondary chamber.

FIGS. 24 through 26 are schematic side view representations of the stages of deployment of yet another passenger airbag embodiment of the present invention.

FIGS. 27 and 28 are respective cross section illustrations of passenger airbag embodiments of the present invention including an internal baffle or tether in the secondary chamber.

FIG. 29 is a schematic assembly drawing and cross section view of a single chamber tethered airbag.

FIGS. 30 and 31 are respective assembly drawings and cross section views of two chamber airbag embodiments in accordance with the present invention.

FIGS. 32 through 36 are respective fabric layout diagrams.

FIG. 33 shows a tethered single chamber airbag layout.

FIGS. 32 and 34 through 36 show multiple chamber airbag layouts.

FIG. 37 is a schematic representation of the production of a multiple chamber airbag of the present invention.

FIG. 38 is a schematic representation of the assembly and cross section of a three chamber airbag of the present invention.

FIGS. 39 through 41 are respective fabric layout diagrams.

FIG. 39 is a fabric layout diagram of a single chamber tethered airbag.

FIGS. 40 and 41 are fabric layout diagrams of multiple chambered airbag of the present invention.

FIG. 42 is a schematic cross section view of a three chamber passenger airbag of the present invention.

FIG. 43 is an aerial view of a portion of a fabric web with lines indicating the specific locations for cutting to form six separate multiple chamber passenger airbag cushions.

FIG. 44 is an aerial view of a portion of a fabric web with lines indicating the specific preferred locations for cutting to form two sets of fabric panels to manufacture two separate inventive multiple chamber top mount airbag cushions, each for the inclusion within a vehicle restraint system configured within a module.

DETAILED DESCRIPTION OF THE INVENTION

Reference will now be made in detail to potentially preferred embodiments of the invention, examples of which have been illustrated in the accompanying drawings. It is to be understood that it is in no way intended to limit the invention to such illustrated and described embodiments. On the contrary, it is intended to cover all alternatives, modifications and equivalents as may be included within the true spirit and scope of the invention as defined by the appended claims and equivalents thereto.

The current single-chamber airbag (FIGS. 1 and 4) has two significant drawbacks: First, it may exert a large rebound force on the occupant after it is deployed, putting the occupant at possible risk of neck injury. Second, it may hurt rather than protect an occupant if the occupant is sitting very close to the airbag (as shorter and/or older drivers often do) when a collision occurs. The two-chamber (or three chamber) airbag of the present invention can reduce the rebound dramatically and can provide protection for an out of position occupant sitting close to the airbag.

At least one embodiment of the two-chamber airbag disclosed herein is based on the current single-chamber airbag design but with several novel modifications to provide much improved safety and performance (FIGS. 2, 3, and 5). The current single chamber airbag can be modified to be used as the primary chamber of the two-chamber airbag. A piece of fabric 22 of appropriate size is sewn to the outside (or inside) surface of the front panel 24 of the primary chamber to create the secondary chamber. One or more apertures 26 are opened between the primary and secondary chambers. In order for the secondary chamber to inflate properly, the tethers 28 of the primary chamber are preferably shortened to 50% to 80% of their original length. The size of the tether sewing to the inner surface of the front panel of the primary chamber is also adjusted to create a desired concave shape of the secondary chamber when deployed. Rear panel 30 of the primary chamber includes vent openings 32 and a gas inlet.

FIGS. 1 and 2 schematically compare the typical components used in the manufacturing of a current single chamber airbag 10 and the new dual chamber airbag 20 (FIGS. 4 and 5). In FIG. 3, the step-wise sewing approach for this new dual chamber airbag 20 is illustrated. From FIG. 3, it is obvious that the manufacturing steps involved in the multiple chamber bag 20 of the present invention is similar to the current approach except for the added steps of attaching the tether portions, attaching the smaller panel, adding vents between the primary and secondary chambers, etc.

FIGS. 4 and 5 of the drawings compare schematically the design and the shapes of the single chamber airbag 10 and the two-chamber airbag 20 when deployed.

The two-chamber airbag 20 preferably shows significantly improved safety performance as compared to the single-chamber airbag in terms of reducing rebound and providing protection for an out of position occupant sitting very close to the airbag. Drop tests (where an 83-lb. weight was dropped on the inflated bags) showed that the rebound distance of the weight from the two-chamber airbag was reduced as much as 70% from that of the single chamber airbag (FIG. 11). Impact tests (where the movement distance was measured from the weight initially resting in a fixed position after it was impacted by the deploying airbag) showed that the energy dissipated on the weight by the two-chamber airbag was much less than that from the single-chamber airbag when the weight was at the same initial rest position (FIG. 12). In other words, the two-chamber airbag dissipates the same amount of energy to the occupant sitting much closer to the steering wheel, thus providing protection for an out of position occupant (OOPO)

sitting close to the airbag. The inflation test showed that due to the shortened tether, the primary chamber of the two-chamber airbag inflated much faster with a much shorter maximum excursion length than the single chamber airbag, again providing protection for an out of position occupant sitting close to the airbag.

Selected Objects of at Least Some of the Embodiments of the Present Invention

1. To provide a new and improved airbag for avoiding or reducing injuries caused by the airbag itself during deployment.
2. To provide a new and improved airbag that can provide protection for an out of position occupant sitting close to the airbag at the instant of collision.
3. To provide a new and improved airbag that is simple and easy to construct thus reducing the production cost.

Selected Advantages of at Least One Embodiment of the Present Invention

1. Low cost and easy to construct: The two-chamber airbag is very manufacturing friendly. Most plants can produce such bags without any new equipment. The only extra cost is the piece of fabric that defines the outer surface of the secondary chamber.
2. Tethered Design: The two-chamber airbag is tethered, it is very easy to control the shape and excursion of the deployed bag by controlling the length and position of the tether.
3. Stronger secondary chamber: In the two chamber airbag design, the final vent of the secondary chamber is through the primary chamber, thus having a relatively strong secondary chamber.
4. High safety performance: The two-chamber airbag provides a softer landing for the occupant. It significantly reduces the rebound, minimizing the injuries caused by the deploying airbag. It also provides protection for the short occupant sitting close to the airbag.

The secondary chamber may have other shapes, e.g. 3D. The secondary chamber may also be tethered. The fabric used for the secondary chamber may be softer than that for the primary chamber. This concept can also be applied to passenger side bags.

Uniqueness and Advantages of Multiple Chamber Airbags

1. Low Cost and Easy to Construct

As compared to the airbags of others, one advantage is simple construction and low cost. The two-chamber airbag is a unique modification of current production airbags. It is very manufacturing friendly. The plant can produce such bags without adding new equipment. The only extra cost is the piece of fabric that defines the outer (or inner) surface of the secondary chamber. However, by novel fabric cutting design, the new airbag actually uses less fabric than the current production bag (see, for example, FIGS. 6 and 7). There is less wasted fabric per yard of starting material.

2. Tethered Design

The two-chamber airbag is tethered, hence it is very easy to control the shape and excursion of the deployed bag by controlling the length and position of the tether. This is quite different from most of the airbags that are not tethered. For example, by shortening the tether length, a desired shape is formed that can actually act as a catcher for the out-of-position occupant (see FIGS. 8 and 9 for both outside and inside sewn secondary chamber).

Further, when the tethers are attached in such a way that the sewn portion of the tether and front fabric of the primary chamber (in the case of outside sew) or the secondary chamber fabric (in the case of inside sew) form a closed chamber, this chamber can act as a modulator to further control the inflation rate of the secondary chamber. In this case, the interconnecting vents are opened inside the sewing diameter. FIG. 10 shows one means on how to control the inflation rate as an example. Holes of appropriate size are opened on the sewn tether at locations such that they partially overlap the interconnecting vents. At least one slit may be cut on the holes so that the holes will enlarge at high pressure.

The function of the thus formed "gas regulator" is as follows: It restricts the flow of the gas at initial stages such that the inflation of the secondary chamber is further delayed to protect the out of position occupant who sits very close to the airbag. When the primary chamber pressure is built up, the slit will open to allow gas flow into secondary chamber quickly to protect normal positioned heavier occupant. This feature is particularly effective when a two-stage inflator is used (FIGS. 8–10).

3. Stronger Secondary Chamber

In at least one of the present designs, the size of the secondary chamber is smaller than the primary chamber. Also the final vent of the secondary chamber is through the primary chamber. This design enables a relatively strong secondary chamber when fully inflated for protection of a heavier occupant.

4. High Safety Performance

The two-chamber airbag can provide a softer landing for the occupant. It can significantly reduce the rebound, minimizing any injuries caused by the deploying airbag itself. It also provides protection for the short occupant sitting close to the airbag.

Following are Test Results:

The inflation test (cold gas test, not actual inflator) showed that the primary chamber of the two-chamber airbag reached maximum pressure much faster than the control bag (single chamber production bag) (38 ms vs. 54 ms). The typical airbag inflation time in an automobile using an actual inflation (hot gas inflation) is about 33 ms for a driver bag and about 52 ms for a passenger bag. At this stage, the secondary chamber was only partially inflated. The maximum excursion of the primary chamber of the two-chamber bag was also much shorter than the control bag at this stage due to shortened tethers. This is very beneficial to a shorter driver sitting very close to the steering wheel.

The drop test where a weight (of 83 lbs.) is dropped over the inflated airbag showed that the two-chamber airbag had significantly shorter rebound distance than the control bag. This will significantly reduce the injuries caused by bouncing back effects. FIG. 11 compares the rebound distance of the control bag and three two-chamber bags with different tether sewing diameters and tether lengths.

Drop tests were conducted by dropping a weight of 83 lbs. from a height of 6 feet onto the inflated bag. The 12 inch×24 inch surface of the weight facing the bag was in the horizontal plane and the weight was constrained so it could move only up or down in the vertical direction. The peak deceleration rate as well as the peak-rebound height of the weight was recorded.

The data show that when the tether length is substantially shortened, the rebound distance is reduced by as much as 70%. At the same time, the peak deceleration, which is a measure of the force experienced by the occupant, is also reduced for the two-chamber airbag by approximately 10%.

Impact tests were conducted in the same facility but with the weight being suspended on a flexile tether a fixed distance above the bag. The bag was inflated into the suspended weight. The maximum height the weight reached on impact was recorded.

The impact test showed that the two-chamber airbag had much less impact force on the object rested at a fixed position as measured by the object movement. FIG. 12 compares the movement of the control bag and three two-chamber bags with different tether sewing diameters and tether lengths.

The height change of the object after it is impacted by the deploying airbag is an indication of the energy dissipated on the body by the inflating bag. FIG. 12 clearly shows that the energy dissipated on the body by the two-chamber airbags is much less than that by the control bag when the object rests at the same initial position. For example, when the object initially rests at 10 inch from the base of the airbag, after it is impacted by the inflating airbag, it moves more than 20 inches by the control bag. In contrast, it only moves less than 4 inches by the two-chamber airbag with 160 mm tether length. This provides evidence of enhanced protection of an out-of-position occupant sitting very close to the multiple chamber airbag during airbag deployment.

Multiple Chamber Airbag Dimensional Parameters

The volume of the current single chamber production driver airbag is about 53–60 liters. The secondary chamber volume of the new bag is about 12 liters and the primary chamber volume of the new bag is about 38 liters. The tether length of the current single chamber production driver bag is approximately 300 mm. The tether length of the primary chamber of new bag can be 160–180 mm.

Variations

Secondary chambers can also be tethered, as illustrated in FIGS. 13 and 14.

Multi-Chamber Airbag

The concept can be easily applied to three or more chamber bags. FIG. 15 shows one example of a three-chamber airbag of the present invention produced by adding an intermediate chamber in between the primary and secondary chambers. The function of the intermediate chamber is to further modulate the gas flow characteristics to achieve desired performance.

Preferably, the airbags disclosed herein consume less fabric than any prior airbags as a result of novel fabric cutting schemes as shown in FIGS. 32 and 34–36.

In addition to the fabric savings mentioned shown in the above, further improvement can be realized by using octagon shaped primary chambers as shown in FIGS. 34 and 36.

In addition to the primary chamber, the secondary chamber can also use a polygon shaped panel or pleats could be formed to create a three dimensional secondary panel as shown in FIG. 36.

The proposed multiple chamber bag is manufacture friendly and the proposed production process is shown in FIG. 37.

In addition to the secondary chamber, a third chamber can be added as shown in FIGS. 37 and 38 to further delay the inflation of the airbag closer to the occupant.

Addition of the third chamber does not impact fabric utilization because of the novel design proposed in this invention as seen in FIGS. 40.

An exemplary fabric layout for a two chamber passenger airbag is shown in FIG. 41.

FIG. 42 illustrates a three chamber passenger airbag in accordance with the present invention.

The embodiment of FIG. 43 of the drawings is based on a modified conventional top mount passenger side airbag. Secondary front panels are added over vent openings in the front panels to form secondary chambers.

In an alternative embodiment as illustrated in FIG. 44, a front mount application is changed or modified for top dash mount application without any tradeoff in fabric utilization. In accordance with this particular embodiment of the present invention, a front mount bag is changed to a top mount bag by precutting a slit in the fabric in the main panel near the bottom portion of the bag (FIG. 44). When a seam is sewn to connect or close the slit, the fabric gathers around the seam to create an offset in the mount.

In accordance with the present invention, top mount bags can be made in a similar fashion to front mount bags without a substantial tradeoff in fabric utilization.

Turning now to FIG. 44 of the drawings, there is shown a fabric web 310, wherein ten fabric panels to be cut 312, 314, 316, 318, 320, 322, 324, 326, 328, and 330 have been outlined. Also, specific fabric pieces to be removed and slits 328 330, 332 within the two largest fabric panels 312, 314 are outlined as well. The fabric web 310 in this specific example comprised nylon 6,6, 630 denier yarns, woven on a jacquard loom into a fabric 10 comprising 41 picks by 41 ends per inch.

In accordance with the present invention, slits, notches or openings 306, 308 in panels 314, 312 are added to offset the mouth configuration instead of utilizing two separate side panels in accordance with conventional passenger bags (FIG. 43). In accordance with the present invention, fabric utilization is above at least about 90%, preferably above about 95% as in the front mount bag with more than a 50% reduction in total length of the seams, 40% reduction in fabric usage and predominated by straight seams.

The opening, slit, notch, or the like 306, 308 can be of any shape depending on the required profile of the bag. The slit or notch can also be positioned in a non-symmetrical fashion at the bottom or side of the panel depending on the relationship of the instrument panel design and the windshield design. This approach can be used for any given shape of the starting panel.

Secondary panels 328, 330 are attached over (or under) front panels 324, 326 to form secondary chambers.

The peak deceleration experienced by an object being brought to rest by an airbag is an important parameter in determining airbag performance. The peak declaration measured in g's (multiples of the standard acceleration due to gravity) multiplied by the body weight gives the force exerted on the body to bring it to rest. Another important parameter is the amount of rebound experienced by an object after it is brought to rest. This parameter is a measure of energy imparted to the object by the airbag after bringing the object to rest and plays a role in possible secondary injury such as whiplash. Still another important parameter is the energy imparted to an object when the object is close enough for the bag to contact it while the bag is still inflating. This parameter is important for out of position occupants such as a driver of short stature who must sit very close to the steering wheel. In general one desires to have all three of these parameters to be as low as possible.

For the examples cited, the double chamber bags of the present invention had substantially the same peak deceleration within ±2 g as the conventional single chamber control bag. This is probably within the range of experimental error. For certain tether length and size of vent area between the secondary and primary chambers, drop tests demonstrated the rebound height of the double chamber bag to be, within experimental error, always less than that for the control bag and as low as 70% less of the rebound height of the control bag. The energy imparted to the double chamber bag in the impact test was always less than that for the control bag and as low as ⅓ of the energy imparted to the control bag.

Passenger Side Airbags

The concept is also applicable to passenger side airbags. Single chamber passenger airbags that are currently in use do not have controlled excursion of the front reaction surface when it comes to the providing occupant protection for both a $5^{th}$ percentile and a $95^{th}$ percentile occupants. De-powered airbags are not the long-term solution because of the tradeoff in the protection for a $95^{th}$ percentile occupants, even though they may be adequate for a $5^{th}$ to $50^{th}$ percentile occupants. Smart airbag technologies under development do not adequately address this problem, but only differentiate between single and multi stage inflator firing scenarios. The solution to this problem can not be completely answered by multistage inflators. The airbags need to deploy in stages with controlled excursion and inflated volume independent of the occupant size.

Today, this problem is tackled by providing a secondary bag inside a primary bag (FIG. 16) or by providing a tether that would have a break away seam to control excursion in the punch-out phase of airbag deployment. In addition to being a cost penalty (both material and labor), these two approaches do not provide a complete and repeatable solution, especially on the passenger side application where the area for coverage is about twice compared to the driver side. None of the above solutions adequately address the out-of-position occupant (OOPO) situation where the bag needs to get in position quicker.

A multi chamber airbag is disclosed herein for the passenger side with a novel approach to control bag excursion and the volume at the same time. This approach is based on the current bag designs and can be readily adaptable to any new designs. The current bag can be modified to act as a primary chamber and an outer layer of the fabric is sewn on the front panel to create the secondary chamber. The excursion of the front panel of the primary bag is controlled by internal tether. The length of this tether travel controls the primary bag volume to provide protection for smaller occupants during the punch-out phase. Once the primary chamber inflates completely, then the secondary chamber inflates through the intercommunication vents positioned at the front panel of the primary bag (FIGS. 17 and 18).

With reference to FIG. 17, gas is vented into the secondary chamber through vent opening sin the front panel.

With reference to FIG. 18, gas is vented into the secondary chamber by passing through a permeable fabric or material sewn inside the body of the airbag (such as an uncoated fabric).

The two-chamber passenger bag of the present invention can be made according to FIGS. 17–28.

Preferably, the vent size on the primary bag used to dissipate occupant energy is bigger than the communicating vent between the primary and the secondary bag or chamber. In situations where a smaller occupant will be in contact with the deploying airbag (OOPO), the firing of the second stage of the inflator would be delayed and the secondary chamber would not inflate during the punch out phase. On the contrary, when both stages of the inflator are fired to protect a larger occupant, then the secondary bag or chamber will inflate to function as a larger volume bag. Typical stages of a multi-chamber airbag deployment are shown in FIGS. 21–26.

The secondary chamber can also employ an internal baffle or a tether as shown in FIGS. 27 and 28.

These specific configurations and shapes provide the lowest overall fabric usage as compared to the available inflation airspace volume.

Each of these panels may be formed from a number of materials including by way of example only and not limitation woven fabrics, knitted fabrics, non-woven fabrics, films, laminates, and combinations thereof. Woven fabrics may be preferred with woven fabrics formed of tightly woven construction such as plain or panama weave constructions being particularly preferred. Such woven fabrics may be formed from yarns of polyester, polyamides such as nylon 6 and nylon-6,6 or other suitable material as may be known to those in the skill in the art. Multifilament yarns having a relatively low denier per filament rating of not greater than about 1–4 denier per filament may be desirable for bags requiring particular good foldability.

In application, woven fabrics formed from synthetic yarns having linear densities of about 40 denier to about 1200 denier are believed to be useful in the formation of the airbag according to the present invention. Fabrics formed from yarns having linear densities of about 315 to about 840 are believed to be particularly useful, and fabrics formed from yarns having linear densities in the range of about 400 to about 650 are believed to be most useful.

While each of the panels may be formed of the same material, the panels may also be formed from differing materials and or constructions, such as, without limitation, coated or uncoated fabrics. For example, the front panel of the primary chamber may be uncoated if the fabric sewn to the extension of the front panel is coated. Such fabrics may provide high permeability fabric having an air permeability of about 5 CMF per square foot or higher, preferably less than about 3 CFM per square foot or less when measured at a differential pressure of 0.5 inches of water across the fabric. Fabrics having permeabilities of about 1–3 CFM per square foot may be desirable as well. Fabrics having permeabilities below 2 CFM and preferably below 1 CFM in the uncoated state may be preferred. Such fabrics which have permeabilities below 2 CFM which permeability does not substantially increase by more than a factor of about 2 when the fabric is subjected to biaxial stresses in the range of up to about 100 pounds force may be particularly preferred. Fabrics which exhibit such characteristics which are formed by means of fluid jet weaving may be most preferred, although as noted previously, weaving on jacquard and/or dobby looms also permits seam production without the need for any further labor-intensive sewing or welding operations.

In the event that a coating is utilized on one or more material panels, neoprene, silicone urethanes or disperse polyamides may be preferred. Coatings such as dispersed polyamides having dry add on weights of about 0.6 ounces per square yard or less and more preferably about 0.4 ounces per square yard or less and most preferably about 0.3 per square yard or less may be particularly preferred so as to minimize fabric weight and enhance foldability. It is, of course, to be understood that aside from the use of coatings, different characteristics in various panels may also be achieved through the use of fabrics incorporating differing weave densities and/or finishing treatments such as calendaring as may be known to those in the skill of the art.

While the airbag cushions according to the present invention have been illustrated and described herein, it is to be understood that such cushions may also include additional components such as shape defining tethers, gas vents, and the like as may be known to those in the skill of the art.

Generally, an airbag module manufacturer or automobile manufacturer will specify what dimensions and performance characteristics are needed for a specific model and make of car. Thus, airbag inflation airspace volume, front panel protection area (particularly for passenger-side airbag cushions), and sufficient overall protection for a passenger are such required specifications. In comparison with commercially available airbag cushions, the inventive airbag cushions which meet the same specifications (and actually exceed the overall passenger protection characteristics versus the prior art cushions) but require less fabric, less seam length for sewing operations, and/or the like thus cost appreciably less than those competitive cushions.

Clearly, the inventive bags, which may possess, the same or less available inflation airspace volume and front fabric panel area as the comparative prior art commercially available cushions (bags), require much less in the way of total fabric utilization, which thus correlates into overall much lower effective fabric usage factors. Furthermore, as noted above, these inventive bags (cushions) either performed as well as or outperformed their commercially available, more expensive, counterparts.

While specific embodiments of the invention have been illustrated and described, it is to be understood that the invention is not limited thereto, since modifications may certainly be made and other embodiments of the principals of this invention will no doubt occur to those skilled in the art. Therefore, it is contemplated by the appended claims to cover any such modifications and other embodiments as incorporate the features of this invention in the true spirit and scope of the claims hereto.

What is claimed is:

1. In an airbag cushion filled by gas during inflation, having at least first and second panels connected by edge seams and forming a primary chamber, the improvement comprising a secondary chamber being formed by an third panel attached to a central portion of the second panel, said third panel being smaller than said second panel, and at least one vent hole in the second panel to provide for gas to fill the secondary chamber after the filling of the primary chamber during inflation, and tethers having a length of about 160–180 mm extending between said first and second panels, said tethers being seamed to said second panel near the center of said second panel by way of a circular seam, and forming a concave area in said second panel, below said third panel, when the primary chamber is inflated.

2. The airbag cushion as recited in claim 1, wherein all of said panels and said tethers are at least one of coated and uncoated fabric.

3. The airbag cushion as recited in claim 1, wherein said secondary chamber has a smaller volume than said primary chamber.

4. The airbag cushion as recited in claim 1, wherein said second panel has at least two vent holes formed therein.

5. The air bag cushion as recited in claim 1, wherein said at least one vent opening in said second panel is located adjacent to at least one of said tethers.

6. The airbag cushion as recited in claim 1, further comprising a fourth panel secured to said second panel over said third panel, and wherein said third panel includes a vent opening providing for inflation of a tertiary chamber formed between said fourth panel and said second and third panels.

7. The airbag cushion as recited in claim 6, wherein said fourth panel is larger than said third panel.

8. The airbag cushion as recited in claim 1, wherein said at least one tether is formed of at least two parts, each part of said two parts being joined to another of said two parts.

9. The airbag cushion as recited in claim 8, wherein said two parts of said at least one tether are joined together midway between said first and said second panels.

10. The airbag cushion as recited in claim 1, wherein said vent hole vents gas from said primary chamber into said secondary chamber upon inflation of said airbag cushion.

11. The airbag cushion of claim 1, wherein said second panel is made of uncoated fabric and said first and said third panels are made of coated fabric.

12. The airbag cushion of claim 1, wherein said at least one tether has a vent hole, said vent hole of said at least one tether being offset from said at least one vent hole of said second panel.

13. The airbag cushion of claim 12, wherein said at least one vent hole of said tether and said at least one vent hole of said second panel are slits.

* * * * *